(12) United States Patent
Eyerman et al.

(10) Patent No.: US 11,526,483 B2
(45) Date of Patent: Dec. 13, 2022

(54) STORAGE ARCHITECTURES FOR GRAPH ANALYSIS APPLICATIONS

(71) Applicant: Intel Corporation, Santa Clara, CA (US)

(72) Inventors: Stijn Eyerman, Evergem (BE); Jason M. Howard, Portland, OR (US); Ibrahim Hur, Portland, OR (US); Ivan B. Ganev, Hillsboro, OR (US); Fabrizio Petrini, Palo Alto, CA (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 15/941,262

(22) Filed: Mar. 30, 2018

(65) Prior Publication Data
US 2019/0042613 A1  Feb. 7, 2019

(51) Int. Cl.
G06F 16/00 (2019.01)
G06F 16/22 (2019.01)
G06F 16/901 (2019.01)

(52) U.S. Cl.
CPC ...... G06F 16/2282 (2019.01); G06F 16/9024 (2019.01)

(58) Field of Classification Search
None
See application file for complete search history.

(56) References Cited

U.S. PATENT DOCUMENTS

| | | | |
|---|---|---|---|
| 2004/0073702 A1* | 4/2004 | Rong | H04L 45/20 709/241 |
| 2004/0187118 A1* | 9/2004 | Blainey | G06F 9/522 718/100 |
| 2015/0261886 A1* | 9/2015 | Wu | G06F 16/285 707/798 |
| 2016/0092595 A1* | 3/2016 | Kennedy | G06F 16/9024 707/723 |

* cited by examiner

*Primary Examiner* — Thu Nguyet T Le
(74) *Attorney, Agent, or Firm* — Hanley, Flight & Zimmerman, LLC

(57) ABSTRACT

Methods, apparatus, systems and articles of manufacture to build a storage architecture for graph data are disclosed herein. Disclosed example apparatus include a neighbor identifier to identify respective sets of neighboring vertices of a graph. The neighboring vertices included in the respective sets are adjacent to respective ones of a plurality of vertices of the graph and respective sets of neighboring vertices are represented as respective lists of neighboring vertex identifiers. The apparatus also includes an element creator to create, in a cache memory, an array of elements that are unpopulated. The array elements have lengths equal to a length of a cache line. In addition, the apparatus includes an element populater to populate the elements with neighboring vertex identifiers. Each of the elements store neighboring vertex identifiers of respective ones of the list of neighboring vertex identifiers.

14 Claims, 11 Drawing Sheets

STORAGE ARCHITECTURES FOR GRAPH ANALYSIS APPLICATIONS

FIELD OF THE DISCLOSURE

This disclosure relates generally to graph analysis applications, and, more particularly, to storage architectures for graph analysis applications.

BACKGROUND

In recent years, graph analysis applications are getting more attention as a way to analyze big data sets and internal relationships between the data elements of big data sets. Graphs are commonly represented using adjacency lists. One adjacency list is created per graph vertex and each graph adjacency list identifies all of the vertices connected to the graph vertex. A storage-efficient data structure often used to hold adjacency lists, referred to as a compressed sparse row (CSR) representation, includes the adjacency lists concatenated in a single, large array. As there are no empty elements in the array, the CSR representation is a compact way to store the adjacency lists as compared to storing a full adjacency matrix.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
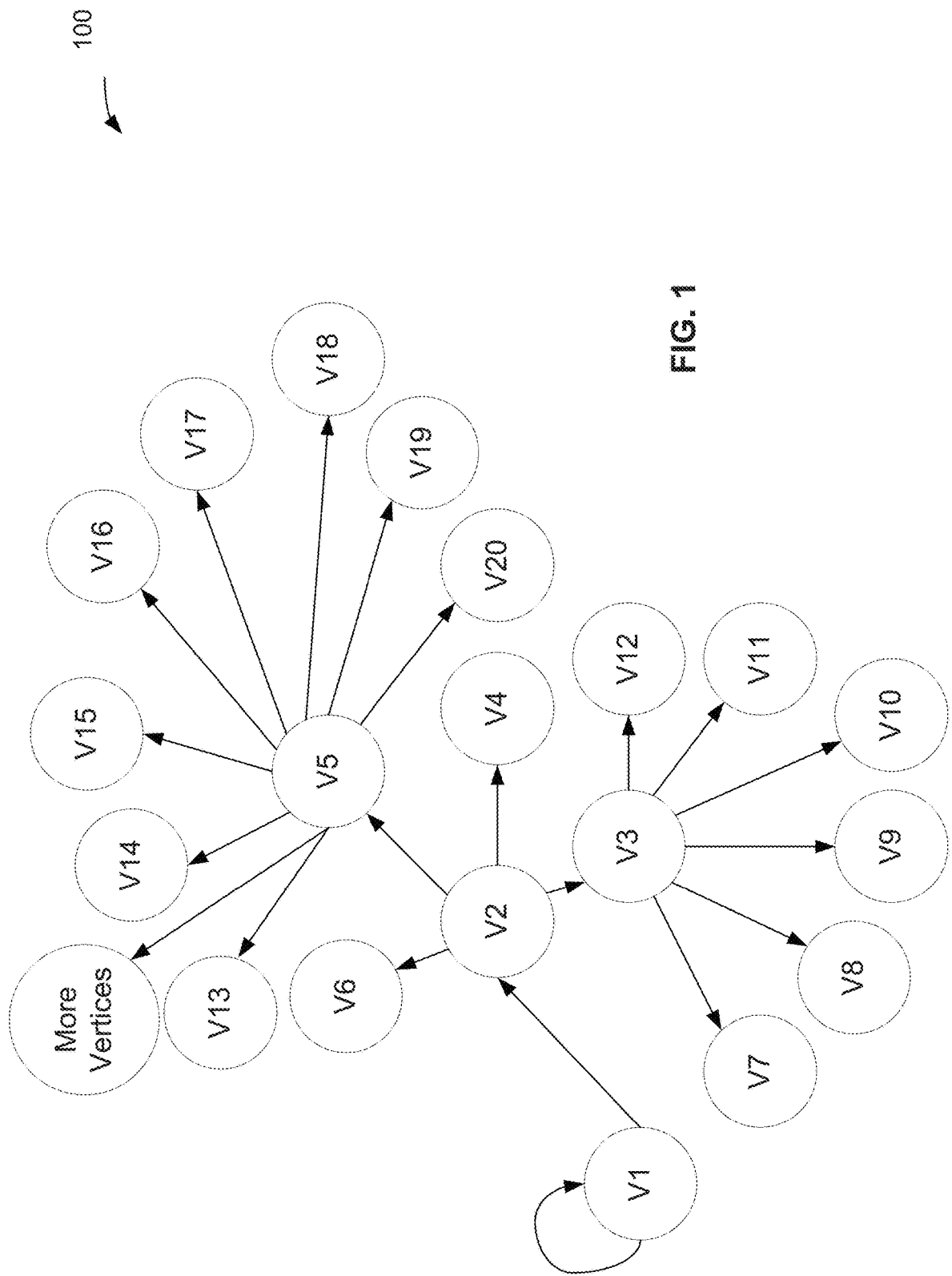
FIG. 1 is a diagram illustrating an example graph containing vertices.

Graphs are often represented as a set of adjacency lists in which each vertex of the graph has an associated adjacency list. Each adjacency list identifies all of the vertices connected to the associated graph vertex. A compressed sparse row (CSR) representation is an efficient data structure often used to hold adjacency lists representing a graph. In a CSR representation, all of the adjacency lists are concatenated into a single, large adjacency array. Due to an absence of empty elements, a CSR representation is a compact representation of the graph as compared to storing the full adjacency matrix.

An index array is created to identify locations at which data is stored in the adjacency array. As such, accessing an adjacency list requires at least two memory access operations. First, the index array is accessed to identify the location of the needed data. Second, the location information from the index array is used to access the adjacency array and obtain the needed data. Unfortunately, chaining two dependent memory accesses can cause significant delay, especially if one or both of the memory accesses cause a cache miss. A cache memory is a volatile hardware or software memory in which data that is accessed frequently may be stored. Accessing a cache memory consumes less processing power than accessing a main memory such that the usage of a cache memory can provide significant processing power savings. A cache hit occurs when the cache is searched for data and the data is found in the cache. A cache miss occurs when the cache is searched for data and the data is not found in the cache such that either the main memory is then accessed or another cache level is searched. Thus, a cache miss is more time consuming due to the need to do additional searching for needed data and a cache miss related to dependent memory accesses compounds the problem of time consumption.

Furthermore, the adjacency lists are variable in length as each graph vertex may have a different number of connected vertices. Due to the varying lengths of the concatenated adjacency lists, the starting index (e.g., an index indicating where an adjacency list begins/starts) of each adjacency list will not be aligned on cache line boundaries. Cache memories are stored in lines of cache generally having a fixed size. A cache line boundary is the boundary between any two lines of cache. As a result of the starting index of the lists not being aligned on cache line boundaries, more cache lines are fetched than strictly needed to be when the cache is accessed thereby wasting memory bandwidth and causing the cache to be filled with useless data. By way of example, consider a vertex that is connected to two other vertices and that has a corresponding adjacency list having a first element stored in the last 4 bytes of a first cache line and a second element stored in the first 4 bytes of a second cache line. Fetching this adjacency list requires fetching 2 cache lines, which results in wasting 94% of memory bandwidth and cache space. Assuming 4 byte elements and 64 byte cache lines, the example includes fetching 128 bytes for only 8 bytes of useful data.

In addition to the described performance issues associated with using a CSR representation, CSR representations are not designed to accommodate dynamic insertions or deletions of vertices and edges. Adding an edge to an existing graph means adding one element to the adjacency lists of the two vertices that this edge connects. In CSR representations, this requires shifting all of the adjacency lists that are located (in the adjacency array) after the adjacency list associated with the added edge one or two elements down. This amounts to an immense memory operations. Additionally, the starting indices in the index array for most of the vertices will also need to change. As a result, CSR representations are not recommended and typically not used for dynamically changing graphs.

FIG. 1 is a diagram illustrating an example graph 100 containing example vertices (V1-V20). The graph 100 is used to describe example operations of the invention disclosed herein. In the example graph 100, vertex V1 is connected to itself and is further connected by an edge to vertex V2. Vertex V2 is connected by respective edges to vertices V3, V4, V5 and V6. Vertex V3 is connected by respective edges to vertices V7, V8, V9, V10, V11, and V12. Vertex V4 is not connected to any vertices although it can be reached from vertex V2. Vertex V5 is connected by respective edges to vertices V13, V14, V15, V16, V17, V18, V19 and V20.

Vertices that are connected by an edge are referred to as being neighbors and/or adjacent to one another. Thus, in this example, V1 neighbors with (e.g., is adjacent to) itself (i.e., vertex V1) and with vertex V2. Vertex V2 neighbors with vertices V3, V4, V5 and V6. Vertex V3 neighbors with vertices V7, V8, V9, V10, V11, and V12. Vertex V4 does not have any neighbors. Although vertex V4 can be reached from vertex V2, vertex V4 does not lead back to vertex V2, thus, vertex V4 does not have any neighbors. Vertex V5 neighbors with vertices V13, V14, V15, V16, V17, V18, V19 and V20.

Figure 2:
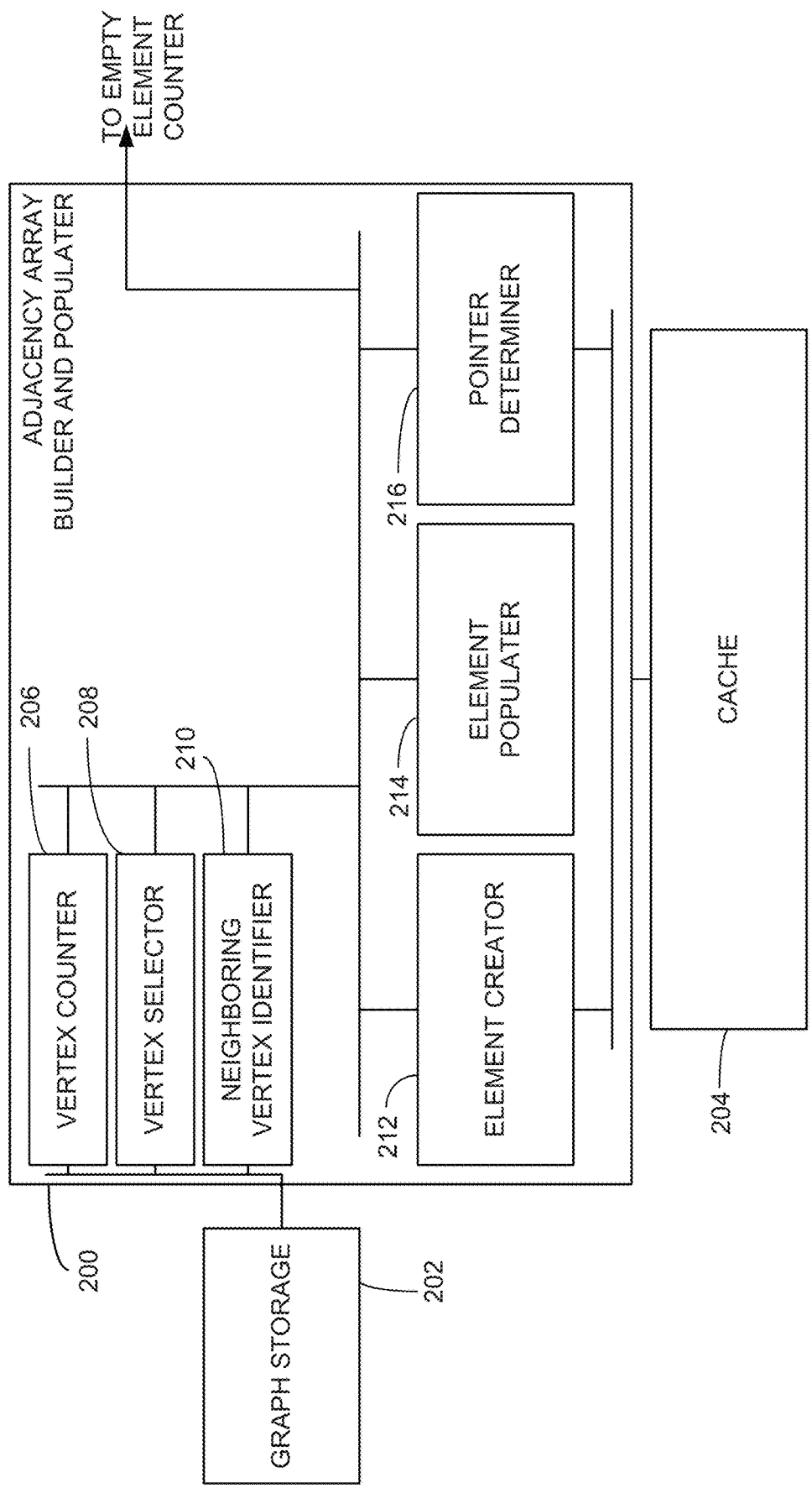
FIG. 2 is a block diagram of an example adjacency array builder and populater to build and populate an adjacency array in accordance with the teachings of this disclosure.

FIG. 2 is a block diagram of an example adjacency array builder and populator 200 that is in communication with a graph storage 202 containing graph data (e.g., graph data representing the graph 100 of FIG. 1) and a memory cache 204. The example adjacency array builder and populator 200 includes an example vertex counter 206, an example vertex selector 208, an example neighboring vertex identifier 210, an example element creator 212, an example element populator 214 and an example pointer determiner 216. The example vertex counter 206 accesses the graph storage 202 and counts the number, "n," of vertices included in the graph 100.

In some examples, the vertex counter 206 supplies the number of vertices, n, to the example element creator 212 for use in creating an array having a number of array elements equal to the number of vertices, n, included in the graph 100. In some examples, the element creator 212 creates the array of elements in the example memory cache 204 and structures each element of the array to have a length equal to the length of a cache line. In this disclosure, the elements are also referred to as rows of the array. In some examples, the element creator 212 further builds each element to include storage positions for a fixed number of neighboring vertex identifiers (referred to herein as vertex identifier storage positions) and to include a storage position for a pointer. In some examples, the variable "k" is used to refer to the fixed number of vertex identifier storage positions included in the elements. Details about the pointer are discussed further below. In some examples, the neighboring vertex identifiers storage positions are 4 bytes in length and the pointer storage is 8 bytes in length and the value of k is equal to 14.

In some examples, the vertex counter 206 also determines an order of the vertices V1-V20 included in the graph 100 and supplies information identifying the vertices and identifying the order of the vertices to the vertex selector 208. In some examples, the vertices are each represented by a vertex identifier (e.g., the first vertex is identified by the vertex identifier V1, the second vertex is identified by the vertex identifier V2, etc.). The vertex selector 208 responds to the information supplied by the vertex counter 206 by selecting the first vertex V1 and supplying the corresponding vertex identifier V1 (also referred to as the selected vertex identifier) to the neighboring vertex identifier 210. The vertex identifier 210 proceeds to identify all of the vertices included in the graph 100 that are neighbors to the selected vertex identifier (e.g., V1).

The example neighboring vertex identifier 210, upon identifying a set of neighboring vertices that are adjacent to the selected vertex V1, supplies a list of corresponding neighboring vertex identifiers to the element populater 214 along with information identifying the selected vertex V1. The element populater 214 uses the list of corresponding neighboring vertex identifiers to populate an element of the array corresponding to the selected vertex V1. Thus, for example, when the selected vertex is the first vertex, V1, the first element of the array is populated with the list of corresponding neighboring vertex identifiers supplied to the element populater 214. In this manner, the neighboring vertices of any vertex of interest can be identified in the array using the number of the vertex of interest.

In some examples, when populating the first element of the array with the list of neighboring vertex identifiers corresponding to the selected vertex V1, the element populater 214 determines whether the number of neighboring vertex identifiers included in the list is equal to or less than the fixed number of vertex identifier storage positions included in the element. If the number of neighboring vertex identifiers is equal to or less than the fixed number of vertex identifier storage positions (k), the element populater 214 fills the vertex identifier storage positions with the neighboring vertex identifiers, and fills any remaining, empty vertex identifier storage positions with zeros (or some other value used to represent empty positions). In some examples, when the example list associated with a selected vertex does not have any neighbors, all of the neighboring vertex identifiers storage positions are filled with zeros (or some other value used to represent empty positions).

In addition, the element populater 214 notifies the example pointer determiner 216 that there is no overflow of neighboring vertex identifiers (e.g., all of the neighboring vertex identifiers fit into a single element). In response, the pointer determiner 216 determines a "null" pointer indicating that there is no overflow and stores the null pointer in the pointer storage position of the first element. In some examples, the pointer determiner 216 supplies the null pointer to the element populater 214 which stores the null pointer in the pointer storage position of the first element.

If the element populater 214 determines the number of neighboring vertex identifiers is greater than the fixed number of vertex identifier storage positions, the element populater 214 fills the vertex identifier storage positions with the neighboring vertex identifiers, and notifies the example pointer determiner 216 that there is an overflow of neighboring vertex identifiers (e.g., all of the neighboring vertex identifiers will not fit into a single element). In response, the pointer determiner 216 notifies the element creator 212 that an element (n+1) is to be added at the end of the array. The element creator 212 creates the added element (e.g., element n+1) and notifies the element populater 212 and the pointer determiner 216 of the newly added element n+1. The pointer determiner 216 uses the information to determine/generate a pointer that identifies the n+1 element and stores the pointer in the pointer storage position of the first element.

The element populater 212 then determines whether the number of neighboring vertex identifiers included in the overflow of the list is equal to or less than the fixed number of vertex identifier storage positions included in the n+1 element. If the number of neighboring vertex identifiers is equal to or less than the fixed number of vertex identifier storage positions, the element populater 214 fills the vertex identifier storage positions of the n+1 element with the neighboring vertex identifiers, fills remaining, empty vertex identifier storage positions (if any) with zeros (or some other value used to represent empty positions), and notifies the example pointer determiner 216 that there is no overflow of neighboring vertex identifiers (e.g., all of the neighboring vertex identifiers fit into a single element). The pointer determiner 216 determines a null pointer and stores the null pointer in the pointer storage position of the n+1 element.

If the element populater 214 determines the number of neighboring vertex identifiers is greater than the fixed number of vertex identifier storage positions of the n+1 element, the element populater 214 fills the vertex identifier storage positions of the n+1 element with a subset of the neighboring vertex identifiers, and again notifies the example pointer determiner 216 that there is an overflow of neighboring vertex identifiers (e.g., all of the neighboring vertex identifiers will not fit into a single element). In response, the pointer determiner 216 notifies the element creator 212 that another element (n+2) is to be added at the end of the array. The identity of the added element n+2 is supplied to the element populater 214 and the pointer determiner 216 which respond to the information in the manner described above (e.g., determining a pointer (n+2) and storing the pointer in the pointer storage position of the n+1 element, determining whether the number of neighboring vertex identifiers included in the overflow of the list will fit into a single element and, if so, storing the overflow in the n+1 element, populating empty storage positions with zeros and placing a null pointer at the end of the n+1 element. If not, notifying the pointer determiner so that yet another element n+3 can be added to the end of the array and populated accordingly.)

The element creator 212, element populater 214, and pointer determiner 216 continue to operate in the manner described above until all of the neighboring vertex identifiers of the first list have been stored in the array. After storage of the first list of neighboring vertex identifiers, the vertex selector 208 is notified by the element populater 214 which selects a next vertex in the ordered set of vertices (e.g., the second vertex V2) and the neighboring vertex identifier 210, element creator 212, element populater 214 and pointer determiner 216 proceed to identify and store a list of neighboring vertex identifiers adjacent to the vertex V2 in the manner described above with respect the neighboring vertices of the vertex V1. The operations are repeated until the neighboring vertices of every vertex of the graph have been identified and stored in the array.

Thus, as described above, each element of the array only includes the neighboring vertices of a single adjacency list (e.g., neighboring vertices that are adjacent to a single one of the vertices of the graph) and the length of each element is the same length as a cache line. As a result, the cache boundary is not crossed when a list of neighboring vertex identifiers of a vertex of interest is extracted from the cache memory. As such there is no useless, unneeded data (e.g., neighboring vertex identifiers of a different vertex) fetched from cache when the neighboring vertex identifiers of the vertex of interest are selected.

Further, each element of the array holds the neighboring vertex identifiers of a selected vertex having the same number as the array element in which the neighboring vertex identifiers are stored (e.g., the neighboring vertices adjacent to selected first vertex (V1) are stored in a first array element (E1)). As a result, there is no need for an extra array index to locate the neighboring vertices of any selected vertex, which eliminates a memory access operation that would otherwise have to occur and further saves memory that would be needed to store an extra array index.

In addition to the operations to build and populate the adjacency array described above, the adjacency array builder and populate is also able to readily accommodate the addition of a new edge, (e.g., a new connection between two vertices). In some examples, a new edge is accommodated by replacing a zero element in the adjacency list corresponding to the vertex connected to the newly added edge with the neighboring vertex identifier of the neighboring vertex coupled via the newly added edge. In some such examples, there is no need to change any of the other elements stored in the array thereby making the addition of a new edge an uncomplicated operation. If, instead, the element of interest does not have any zeros stored in any of the storage positions, a new overflow element can be added to the end of the array to accommodate the effect of the newly added edge and the affected pointers can be adjusted to accommodate the new overflow element (e.g., the pointer of the element of interest can be revised/updated from a "null" pointer to a pointer identifying the new overflow element. Thus, the adjacency array builder and populater 200 disclosed herein also provides a method to insert edges that involves lower overhead than existing techniques (e.g., replacing a zero, or adding an overflow element and changing a pointer is far simpler than existing techniques that often require rewriting and moving significant portion of the data stored in the array.

Figure 3:
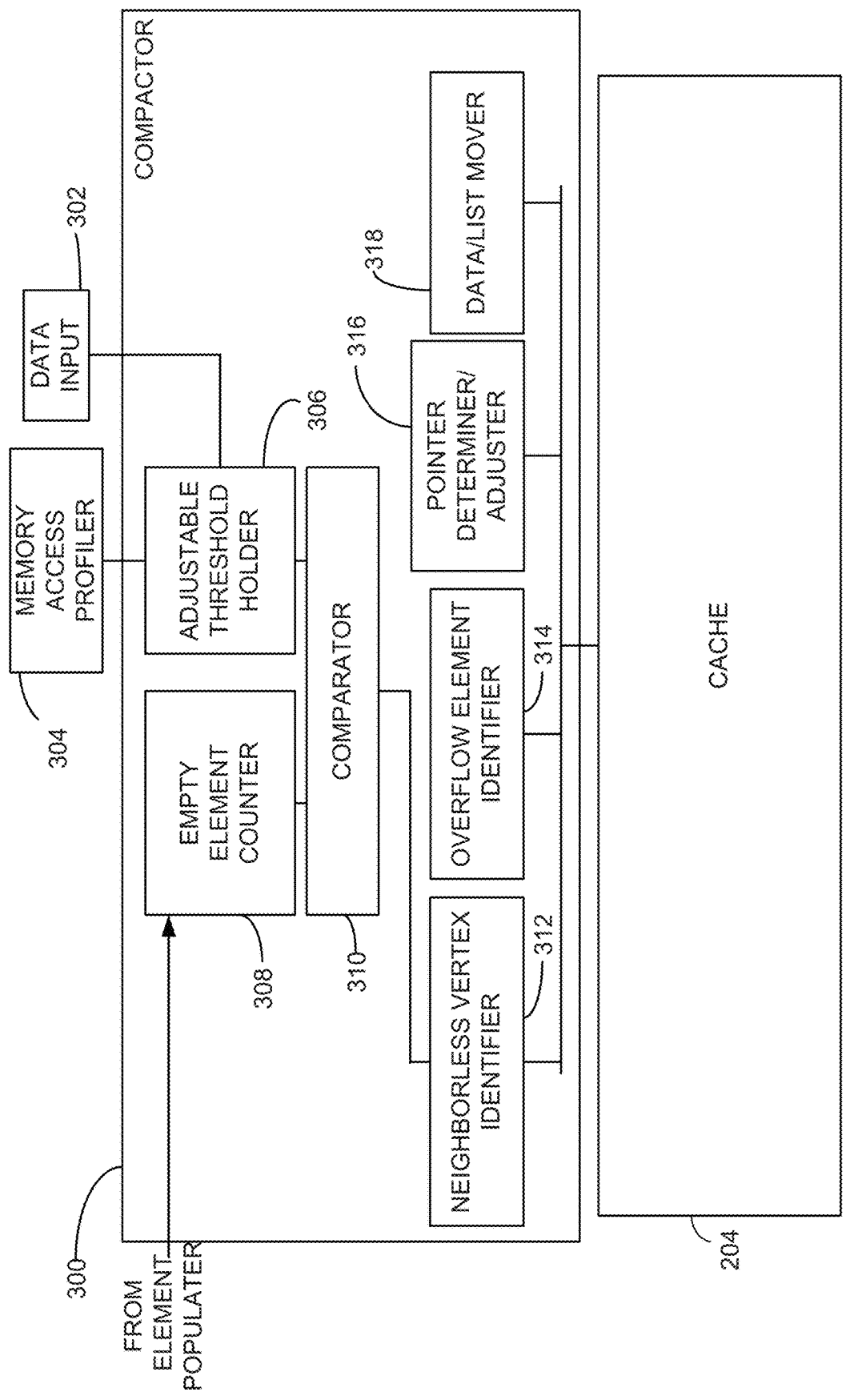
FIG. 3 is a block diagram of an example compactor for use in conjunction with the example adjacency array builder and populater of FIG. 2.

FIG. 3 is a block diagram of an example compactor 300 for use in conjunction with the example adjacency array builder and populater 200 of FIG. 2. The compactor 300 is in communication with the memory cache 204, an example data input 302 and an example memory access profiler 304. In some examples, the compactor 300 operates to reduce the amount of space occupied by the array 204 by moving one or more of the elements added at the end of the array to hold overflow neighboring index identifiers to elements populated with zeros (e.g., elements corresponding to selected vertices having no neighbors).

In some examples, the compactor 300 includes an example adjustable threshold holder 306, an example empty element counter 308, an example comparator 310, an example neighborless vertex identifier 312, an example overflow element identifier 314, an example pointer determiner/adjuster 316, and an example data/list mover 318. The example empty element counter 308 is incremented by the example element populater 214 (see FIG. 2) each time all neighboring vertex identifier storage positions of a same element are populated with zeros because a corresponding, selected vertex has no neighbors. The comparator 310 compares the empty row counter to a threshold stored in the adjustable threshold holder 306. In some examples, the threshold is input via the data input 302 and in some examples, the threshold is dynamically adjusted based on the memory access profiler 304. When the value of the empty row counter satisfies the threshold, the comparator 310 triggers a compacting operation by notifying the neighborless vertex identifier 312.

In some examples, the example neighborless vertex identifier 312 accesses the cache to identify one or more or all of the neighborless vertices. In some examples, this is performed by identifying the vertex corresponding to each of the elements filled entirely with zeros and a "null" pointer (not having any neighboring vertex identifiers) (also referred to as empty elements). The neighborless vertex identifier 312 notifies the example overflow element identifier 314 when all such empty elements have been identified and identifies a first such empty element to the overflow element identifier 314. The overflow element identifier 314 identifies a first overflow element (e.g., element n+1) containing overflow neighboring vertex identifiers (e.g., neighboring vertex identifiers that are part of a list that has been stored in multiple elements). The overflow element identifier 314 determines whether the number of neighboring vertex identifiers stored in the first overflow element n+1 is equal to or less than "k−1" (the variable representing the fixed number of neighboring vertex identifier positions in each element). If not, then the overflow element is not a candidate for movement to another element, and the overflow element identifier 314 identifies a next overflow element n+2 to evaluate against k−1. When the number of neighboring vertex identifiers stored in the first overflow element n+1 is equal to or less than k−1, then the overflow element identifier 314 notifies the example data/list mover 318 which moves/copies the neighboring vertex identifiers currently stored in the overflow element n+1 to the neighboring vertex identifier storage positions of the first neighborless element beginning at the second such storage position. In this way, a zero remains in the first such storage position of the first neighborless element.

When the data is moved, the data/list mover 318 notifies the example pointer determiner/adjuster 316 which responds by searching for an element containing a pointer that points to the n+1 element. This element containing the n+1 pointer contains a first portion of the list of neighboring vertex identifiers that also includes the overflow neighboring vertex identifiers stored in the element n+1. Upon identifying the element containing the n+1 pointer, the pointer determiner/adjuster 316 changes/revises/updates the pointer (n+1) to instead point to the second neighboring vertex identifier storage position of the first neighborless element (e.g., the element into which the neighboring vertex identifiers of the n+1 element have been copied/moved). Thus, the new pointer points to the place in the array at which the overflow of the list of neighboring vertex identifiers is stored. In an example in which the element that originally contained the n+1 pointer is element number 3, and the empty element is element number 4, then the n+1 pointer originally stored in element number 3 is replaced with a new pointer identifying element 4 and further identifying the second neighboring vertex identifier storage position of element 4 (e.g., 4[2]). Thus, the overflow of the list of neighboring vertex identifiers associated with element 3 is now continued in element 4 at the second storage position, and the pointer indicates as much.

In addition to adjusting the pointer of element number 3, the example pointer determiner/adjuster 316 determines a pointer for element 4. Assuming there is no further overflow of the list associated with vertex V3, the pointer is determined to be a null pointer. Otherwise, the pointer will point to another element containing further overflow for the list associated with the vertex V3. The pointer determiner/adjuster 316 instructs the example element creator 212 of FIG. 2 to remove the n+1 element. The element creator 212 removes the n+1 element such that the element formerly numbered n+2 is renumbered n+1, the element formerly numbered n+3 is renumbered n+2, and so on. The element creator 212 notifies the pointer determiner/adjuster 316 when the n+1 element has been removed and the pointer determiner/adjuster 316 responds by adjusting all of the pointers as needed to account for the renumbered elements (e.g., a pointer that points to n+2 is revised to point to n+1 and a pointer that points to n+3 is revised to point to n+2). When all of the changes are made to accommodate for the movement of the data to the formerly empty element and to accommodate for the deletion of the former n+1 element, the pointer determiner/adjuster 316 notifies the neighborless vertex identifier 312 which identifies a next empty element to the overflow element identifier 314 and the operations described above are repeated until all (or a given number) of the empty elements have been filled and/or there are no additional overflow neighboring vertex identifiers to be moved or at least none that have a number of neighboring vertex identifiers less than k−1.

As described above, when overflow neighboring vertex identifiers are moved to an empty element, a zero remains in the first storage position of the first neighborless element. By way of example, as described above, the $4^{th}$ element is an empty element (before the compactor operation is performed) and, after being populated with overflow data, the first storage position remains a zero. By retaining a zero at this location, information about the neighbor status of the fourth vertex V4 is retained in the fourth element, e.g., the fourth vertex, V4, does not have any neighbors. Thus, performing the compactor operation does not cause this information to be lost.

In some examples, the example adjacency array builder and populate 200 (FIG. 2) and the example compactor 300 (FIG. 3) can be used to add original elements to the array instead of just adding overflow elements. This occurs, for example, when a new vertex is added to the graph. In some such examples, the element creator 212 adds an original element between the element n and the element n+1 and populates the new element according to the operations described with respect to FIG. 2. As a result, the value of n is incremented by one. In some such examples, the example pointer determiner/adjuster 316 of FIG. 3 is notified of the added element and makes adjustments to the pointers of the array as needed to accommodate the newly added element.

As described above, when performing a compacting operation, the compactor 300 searches for and identifies empty elements which can be used to store overflow neighboring vertex identifiers. In some examples, the compactor 300 can achieve further compaction of the adjacency array by also searching for and selecting elements associated with vertices having only a few neighbors (e.g., 1 or 2), and using the remaining (zero-filled) neighboring vertex identifier storage positions of these selected elements for storing overflow lists of other vertices. In some such examples, the example data/list mover 318 inserts a 'zero' in a storage position between the vertex identifiers of two different lists (e.g., lists associated with different indices). As described above, the fixed number of storage positions included in the elements (e.g., k) can be any number, and in some examples, is equal to fourteen such that using this further compacting operation can result in significant space savings.

Figure 4:
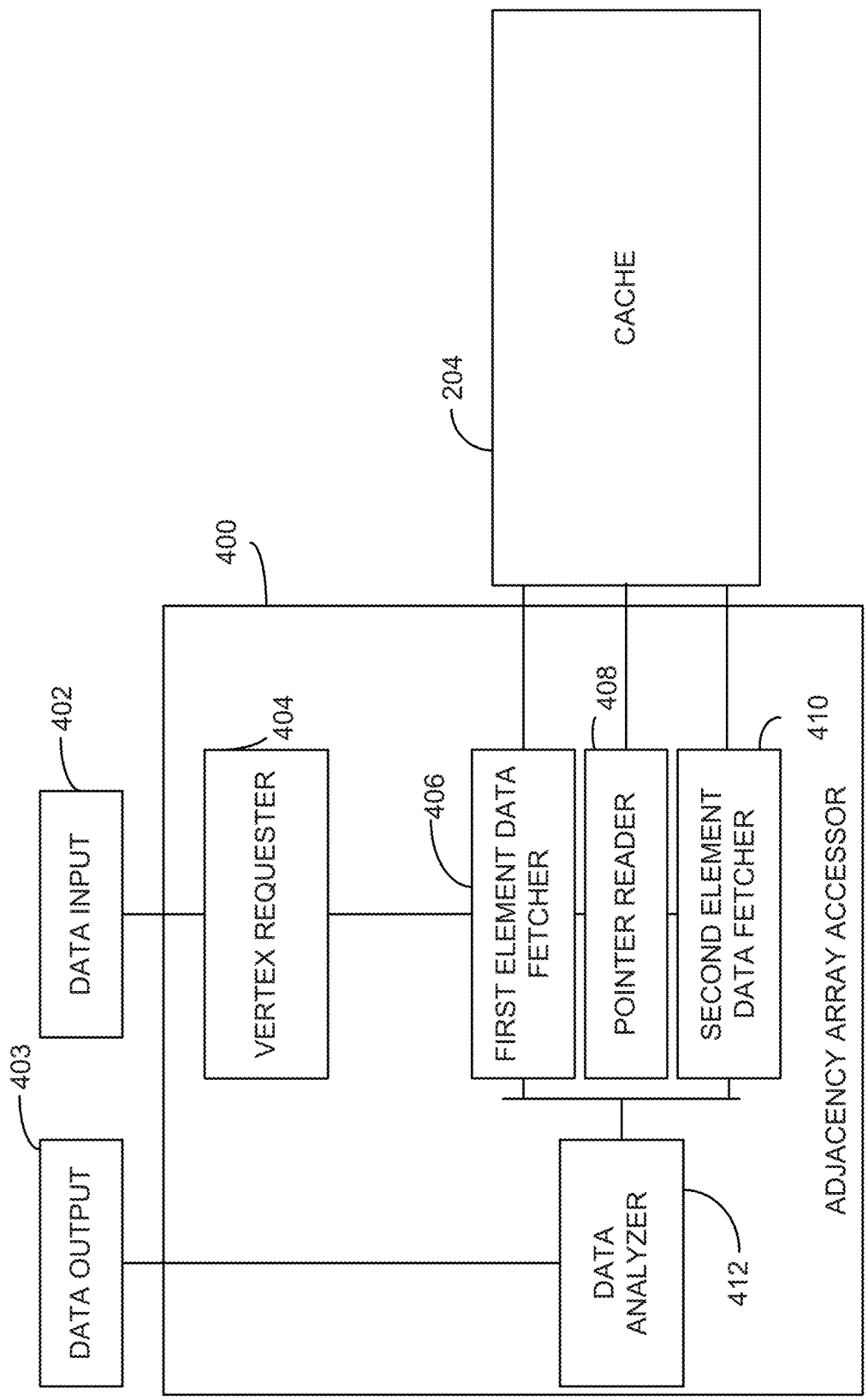
FIG. 4 is a block diagram of an example adjacency array accessor to access an array built with the adjacency array builder and populater of FIG. 3.

FIG. 4 is a block diagram of an example adjacency array accessor 400. The adjacency array accessor 400 performs operations to access the adjacency array built with the adjacency array builder and populater 200 of FIG. 2. In some examples, the adjacency array accessor 400 is in communication with an example data input 402, and example data output 403, and the example memory cache 204 (see also FIG. 2 and FIG. 3). The adjacency array accessor 400 can include an example vertex requester 404, an example first data fetcher 406, an example pointer reader 408, an example second data fetcher 410, and an example data analyzer 412. In operation, a request for information about a data set represented by the example graph 100 (or any graph stored in the graph storage 202 of FIG. 2) is received via the data input 402. In response the vertex requester 404 parses the request and determines a vertex of interest. The vertex requester 404 supplies a vertex identifier corresponding to the vertex of interest to the first element data fetcher 406. The first element data fetcher 406 fetches the neighboring vertex identifiers stored in the element corresponding to the vertex of interest and supplies the fetched identifiers to the data analyzer 412.

When the first element data fetcher 406 is fetching the neighboring vertex identifiers stored in the element corresponding to the vertex of interest, the example first element data fetcher 406 extracts the pointer stored in the element and supplies the pointer to the pointer reader 408. The pointer reader 408 reads the pointer and, when the pointer is a non-null value, identifies the value of the non-null pointer to the second element data fetcher 410. The second element data fetcher 410 uses the non-null pointer to obtain the location of the element containing the overflow neighboring vertices of the vertex of interest and then accesses the element containing the overflow neighboring vertices of the vertex of interest and supplies the data to the data analyzer 412. In some examples, the first and second element data fetchers 406, 410 operate in parallel (or nearly in parallel) such that the overall time required to perform the memory access is greatly reduced. The data analyzer 412 uses the fetched information to perform any type of data analysis and provides output via the example data output 403.

Figure 5:
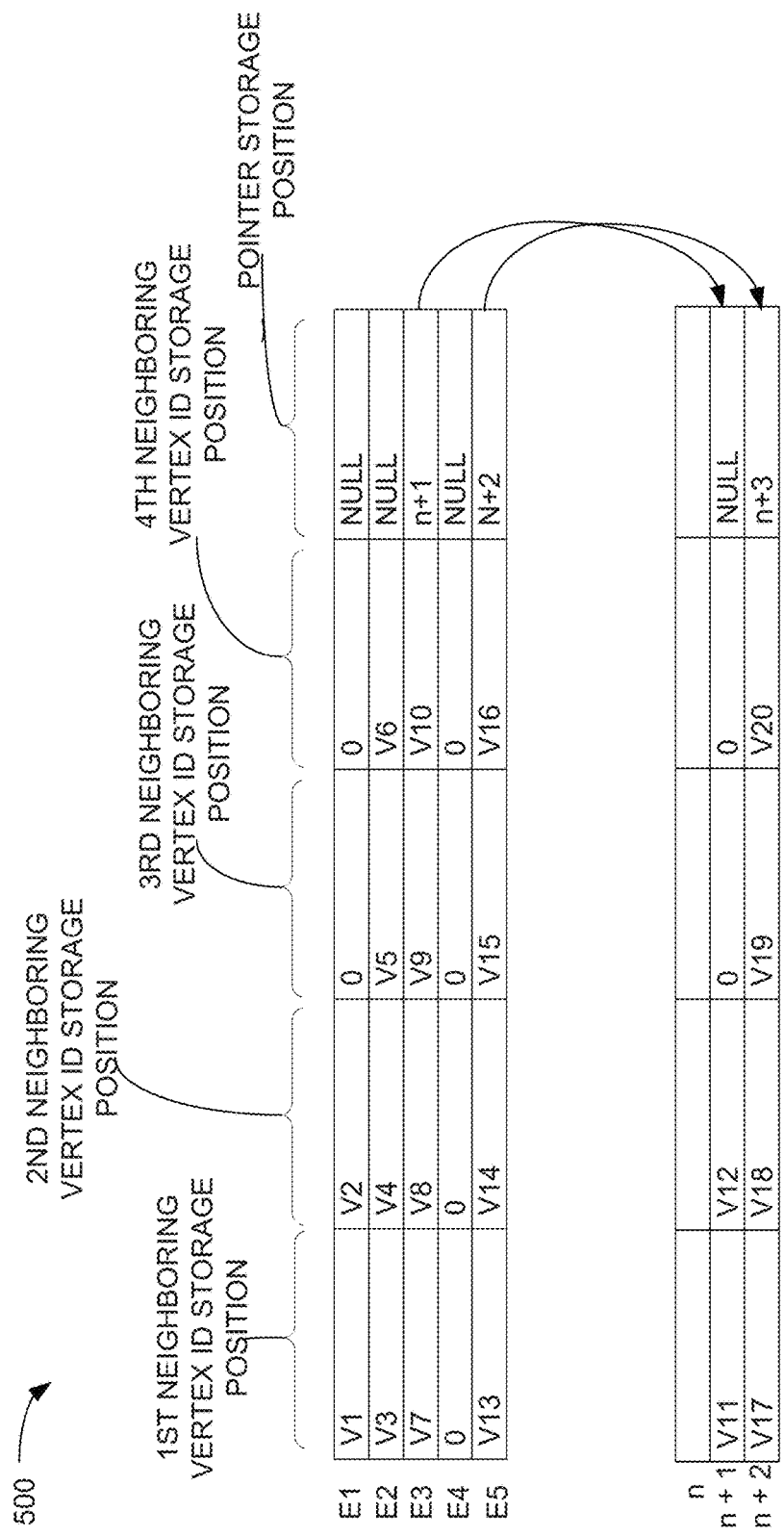
FIG. 5 is an illustration of an example array.

FIG. 5 is an illustration of an example array 500 built using the example adjacency array builder and populater 200 of FIG. 2 and data associated with the graph 100. The array 500 includes "n" original elements (elements E1, E2, E3, E4, E5, En) to store graph data for a graph having "n" vertices. As illustrated, each element includes first, second, third and fourth example neighboring vertex identifier storage positions and a pointer storage position. The first element E1 includes a list of the neighboring vertex identifiers for the first vertex V1 (e.g., V1 and V2). As there are no other neighboring vertices for the first vertex V1, the third and fourth neighboring vertex identifier storage positions are filled with zeros and the pointer storage contains a "null" pointer. The second element E2 contains the neighboring vertex identifiers for the second vertex V2 (e.g., V3, V4, V5, V6) and there are no other neighboring vertices for the first vertex V1 so the pointer storage contains a "null" pointer.

The third element E3 contains the neighboring vertex identifiers for the third vertex V3 (e.g., V7, V8, V9, V10) but there are additional neighboring vertex identifiers (overflow identifiers) so the pointer storage is populated with a pointer to the array element n+1. As described above, the element creator 212 creates the additional, overflow array element n+1 due to the fact that the third vertex V3 has more than "k" neighboring vertex identifiers. In this example, k=4. The array element n+1 is populated with the overflow neighboring vertex identifiers V11 and V12 and the third and fourth storage positions are populated with zeros. Due to the fact that all of the overflow fits within the element n+1, the pointer stored in the pointer storage is a "null" pointer.

The fourth element E4 corresponding to the fourth vertex, V4 does not have any neighboring index identifiers as the fourth vertex, V4 does not have neighbors. As a result, the fourth element E4 is called an empty element and populated with zeros and a "null" pointer. The fifth element E5 contains the neighboring vertex identifiers for the fifth vertex V5 (e.g., V13, V14, V15, V16) but there are additional neighboring vertex identifiers (overflow identifiers) so the pointer storage is populated with a pointer to the array element n+2. As described above, the example element creator 212 creates the additional, overflow array element n+2 due to the fact that the fifth vertex V5 has more than "k" neighboring vertex identifiers. In this example, k=4. The array element n+2 is populated with the overflow neighboring vertex identifiers V17, V18, V19, V20. In this example, the pointer n+3 is stored in the pointer storage thereby indicating that there are additional overflow neighboring vertex identifiers to be stored in yet another element of the array. Although the graph 100 of FIG. 1 includes vertices 1-20, it is understood to include any number of additional elements. Further, in the example array 500 of FIG. 5, the number of neighboring vertex storage positions (k) is equal to four. In practice, the number of neighboring vertex storage positions (k) can be fourteen or any desired number that can be accommodated in a cache line of a desired (or set) length.

Figure 6:
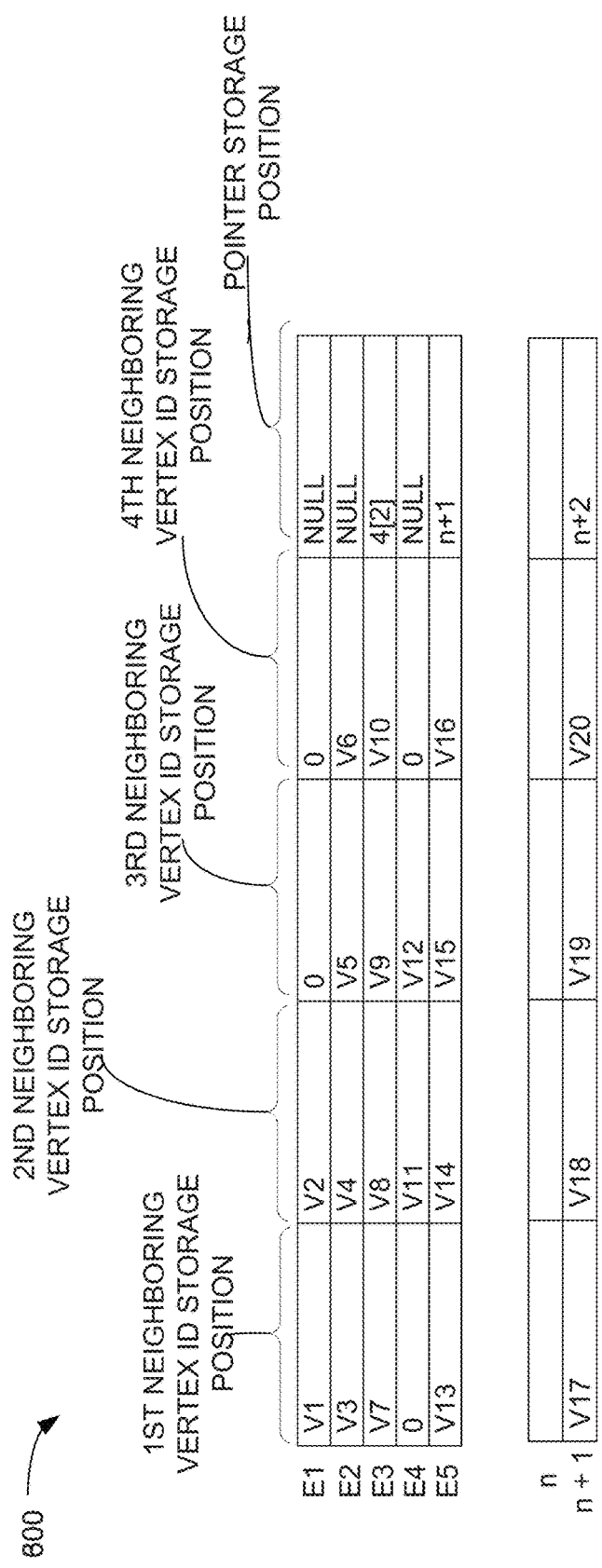
FIG. 6 is an illustration of the example array of FIG. 5 after having been compacted using the compactor of FIG. 3.

FIG. 6 is an illustration of an example compacted array 600 and represents the results of performing a compactor 300 operation on the example array 500 of FIG. 5. The array 600 includes "n" original elements (elements E1, E2, E3, E4, E5, En) to store graph data for a graph having "n" vertices. As illustrated, each element includes first, second, third and fourth example neighboring vertex identifier storage positions and a pointer storage position. The first element E1 remains unchanged after the compactor operations because the first element is not an empty element. The second element E2 likewise remains unchanged after the compactor operations because the second element is not an empty element.

The first, second, third and fourth neighboring vertex identifier storage positions of the third element E3 remain unchanged. However, the compactor operation caused the pointer to change from n+1 to 4[2]. In particular, the compactor operations resulted in the relocation/movement of the overflow neighboring vertex identifiers associated with the third vertex and stored in the overflow element n+1 of FIG. 5 to the fourth element E4. The fourth element E4 was selected to store the overflow of the neighboring vertex identifier of the third vertex because the fourth element E4 was formerly an empty element (see FIG. 5) and because the number of overflow elements (2) stored in the former n+1 element of FIG. 5 is less than k−1 (e.g., k−1=4−1=3, and 2 is less than 3). Thus, the pointer of the third element E3 now points to the second storage position of the fourth element E4 where the storage of overflow neighboring vertex identifiers associated with the third vertex begins. Also, because the number of overflow neighboring vertex identifiers is less than k−1, the pointer stored in the fourth element E4 is a "null" pointer.

The first, second, third and fourth neighboring vertex identifier storage positions of the fifth element remain unchanged. However, the compactor operation caused the pointer to change from n+2 to n+1. In particular, the compactor operations resulting in the populating of the fourth element E4 with overflow neighboring vertex identifiers and also caused the original overflow element n+1 to be removed from the array. As a result, the element formerly numbered n+2 was renumbered in the compactor operation to n+1. To account for this renumbering of the overflow element formerly numbered n+2, the pointer stored in element E5 is now changed from n+2 to n+1.

While example manners of implementing the example adjacency array builder and populater 200, the example compactor 300, and the example adjacency array accessor 400 are illustrated in FIGS. 2, 3, and 4, one or more of the elements, processes and/or devices illustrated in FIGS. 2, 3 and 4 may be combined, divided, re-arranged, omitted, eliminated and/or implemented in any other way. Further, the example graph storage 202, the example cache 204, example vertex counter 206, the example vertex selector 208, the example neighboring vertex identifier 210, the example element creator 212, the example element populater 214, the example pointer determiner 216, the example adjustable threshold holder 306, the example empty element counter 308, the example comparator 310, the example neighborless identifier 312, the example overflow element identifier 314, the example pointer determiner/adjuster 316, the example data/list mover 318, the example vertex requester 404, the example first element data fetcher 406, the example pointer reader 408, the example second element data fetcher 410, the example data analyzer 412 and/or, more generally, any and/or all of the example of adjacency array builder and populater 200 of FIG. 2, the example compactor 300 of FIG. 3, and the example adjacency array accessor 400 of FIG. 3 may be implemented by hardware, software, firmware and/or any combination of hardware, software and/or firmware. Thus, for example, any of the example graph storage 202, the example cache 204, the example vertex counter 206, the example vertex selector 208, the example neighboring vertex identifier 210, the example element creator 212, the example element populater 214, the example pointer determiner 216, the example adjustable threshold holder 306, the example empty element counter 308, the example comparator 310, the example neighborless identifier 312, the example overflow element identifier 314, the example pointer determiner/adjuster 316, the example data/list mover 318, the example vertex requester 404, the example first element data fetcher 406, the example pointer reader 408, the example second element data fetcher 410, the example data analyzer 412 and/or, more generally, any and/or all of the example of adjacency array builder and populater 200 of FIG. 2, the example compactor 300 of FIG. 3, and the example adjacency array accessor 400 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example graph storage 202, the example cache 204, example vertex counter 206, the example vertex selector 208, the example neighboring vertex identifier 210, the example element creator 212, the example element populater 214, the example pointer determiner 216, the example adjustable threshold holder 306, the example empty element counter 308, the example comparator 310, the example neighborless identifier 312, the example overflow element identifier 314, the example pointer determiner/adjuster 316, the example data/list mover 318, the example vertex requester 404, the example first element data fetcher 406, the example pointer reader 408, the example second element data fetcher 410, the example data analyzer 412 is/are hereby expressly defined to include a non-transitory computer readable storage device or storage disk, such as a memory, a digital versatile disk (DVD), a compact disk (CD), a Blu-ray disk, etc., that stores the software and/or firmware. Further still, any and/or all of the example adjacency array builder and populater 200 of FIG. 2, the example compactor 300 of FIG. 3, and the example adjacency array accessor 400 of FIG. 4 may include one or more elements, processes and/or devices in addition to, or instead of, those illustrated in the FIGS. 2, 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
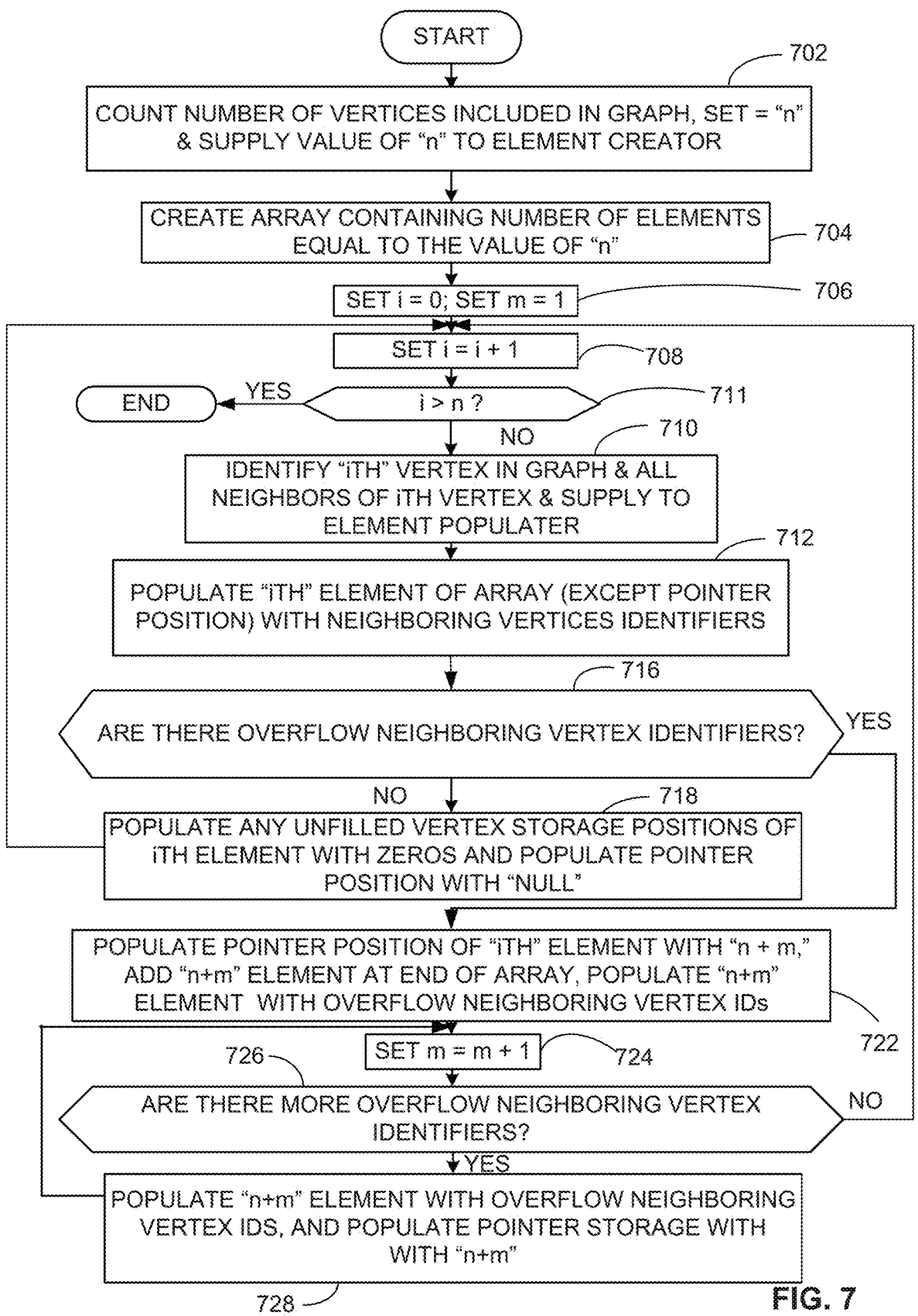
FIG. 7 is a flowchart representative of machine readable instructions which may be executed to implement the example adjacency array builder and populater of FIG. 1.
Figure 8:
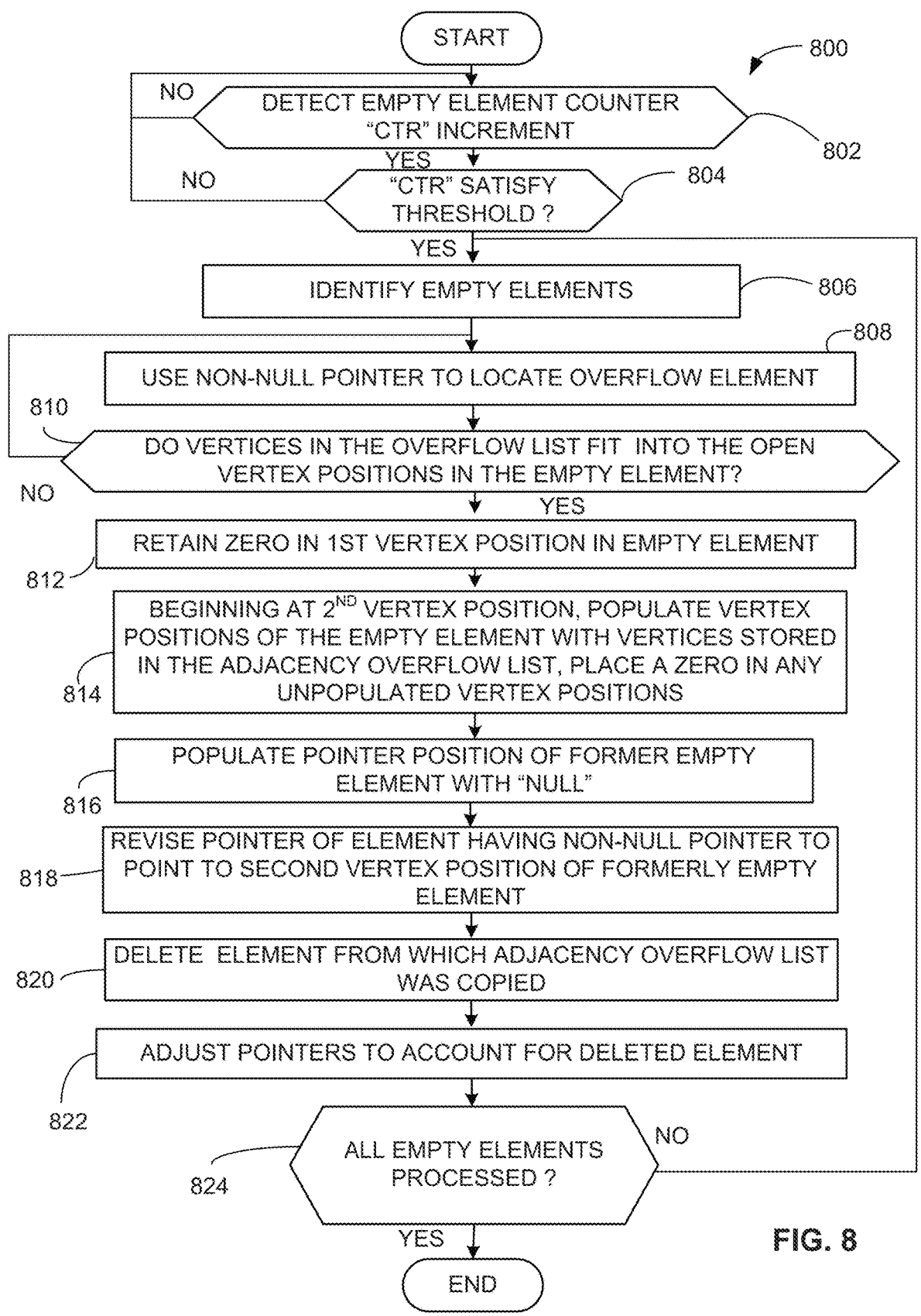
FIG. 8 is a flowchart representative of machine readable instructions which may be executed to implement the example compactor of FIG. 3.
Figure 9:
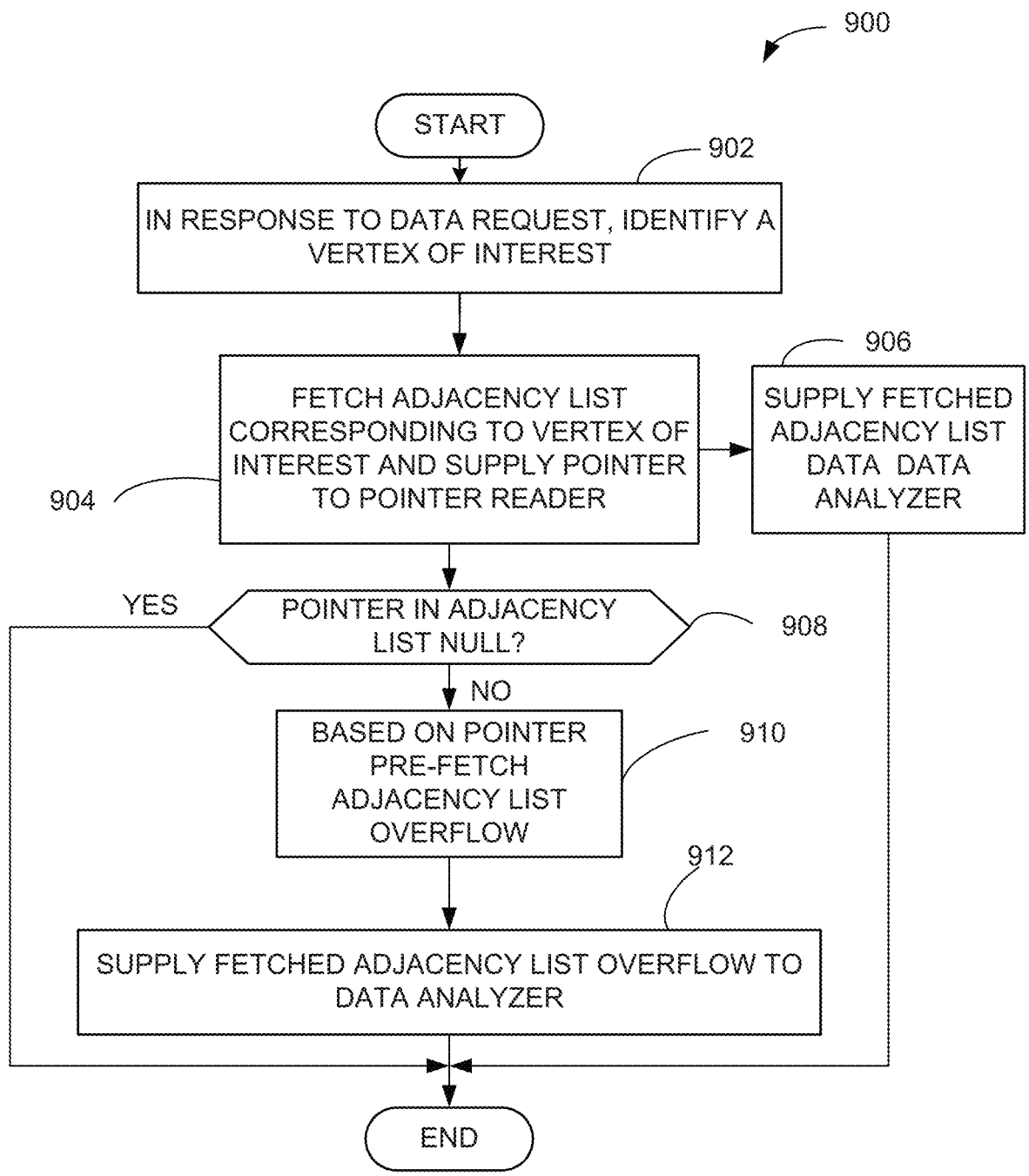
FIG. 9 is a flowchart representative of machine readable instructions which may be executed to implement the example adjacency array accessor of FIG. 4.
Figure 10:
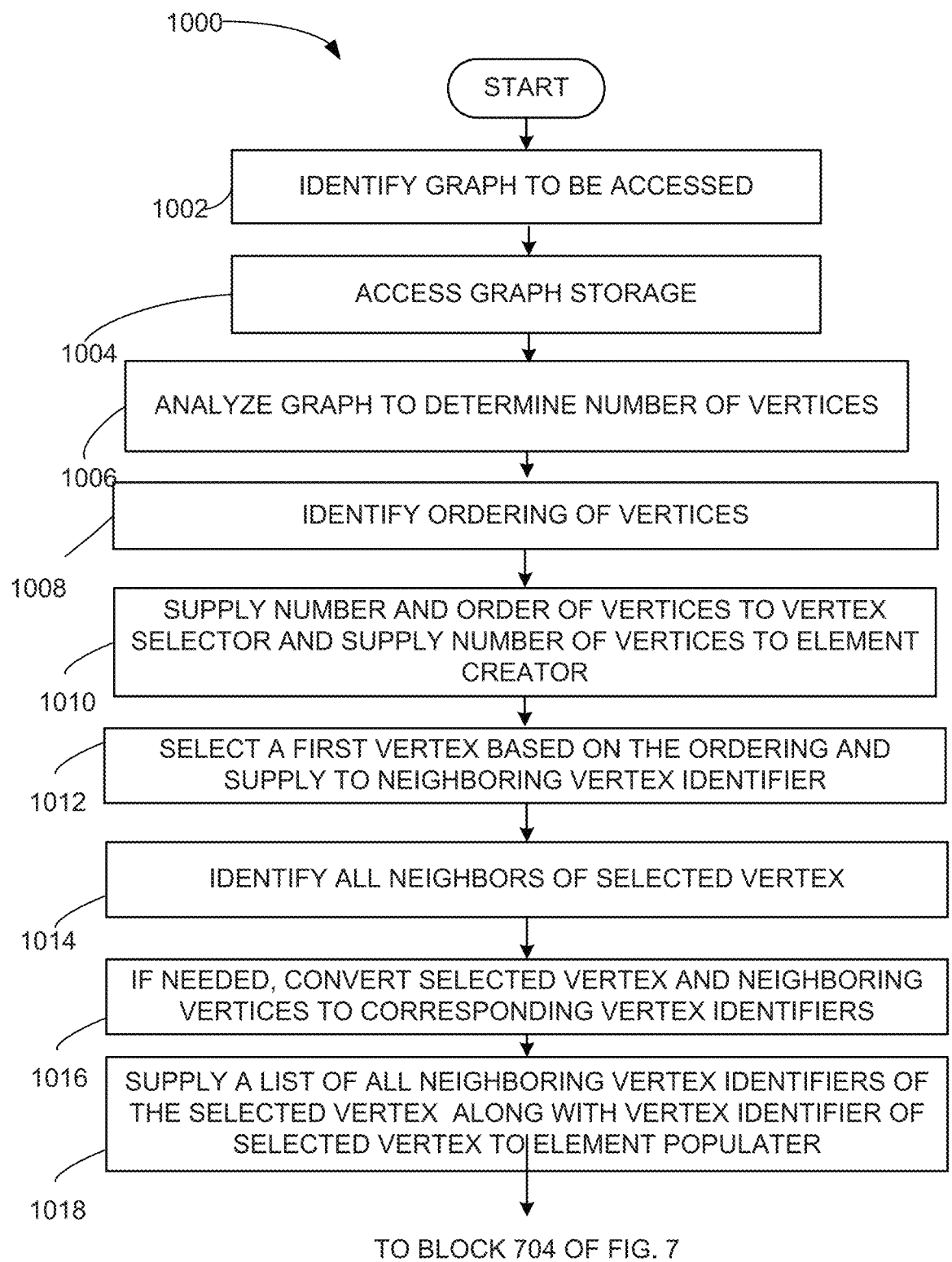
FIG. 10 is a flowchart representative of machine readable instructions which may be executed to implement the example vertex counter, the example vertex selector and the example neighboring vertex identifier of FIG. 2.

A flowchart representative of example hardware logic or machine readable instructions for implementing the example adjacency array builder and populater 200 of FIG. 2 is shown in FIGS. 7 and 10. A flowchart representative of example hardware logic or machine readable instructions for implementing the example compactor 300 of FIG. 3 is shown in FIG. 8. A flowchart representative of example hardware logic or machine readable instructions for implementing the example adjacency array accessor 400 of FIG. 4 is shown in FIG. 9. The machine readable instructions may be a program or portion of a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program(s) are described with reference to the flowcharts illustrated in FIGS. 7, 8 and 9, many other methods of implementing the example adjacency array builder and populater 200 of FIG. 2, the example compactor 300 of FIG. 3 and the example adjacency array accessor 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7, 8, 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 700 of FIG. 7 begins at a block 702 at which the example vertex counter 206 of FIG. 2 accesses the graph storage 202 and counts the number, "n," of vertices included in the graph 100. In some examples, the vertex counter 206 sets the value of "n" equal to the number of vertices and then supplies, n, to the example element creator 212. The example element creator 212 uses the value of n to create an array having a number of array elements equal to the number of vertices, n, included in the graph 100 (block 704). In some examples, the element creator 212 creates the array of elements in the example memory cache 204 and structures each element of the array to have a length equal to the length of a cache line. In this disclosure, the elements are also referred to as rows of the array. In some examples, the element creator 212 further builds each element to include storage positions for a fixed number of neighboring vertex identifiers (referred to herein as vertex identifier storage positions) and to include a storage position for a pointer. In some examples, the variable "k" is used to refer to the fixed number of vertex identifier storage positions included in the elements.

In some examples, the vertex counter 206 also sets a variable "i" equal to zero, and the element populater 214 sets a counter "m"=1 (block 706). The variable "i" represents the vertex currently being operated on by the program 700 as detailed further below. As described further below, the counter "m" is used to track the number of overflow elements added to the end of the array (e.g., after the nth element) as the vectors are processed by the program 700.

Thereafter, the vector counter 206 increments the value of "i" by one (block 708). To determine whether all of the vertices of the graph have been processed, the vertex counter 206 determines whether the value of "i" is greater than the value of "n" (e.g., i>n?) (block 711). If "i" is greater than "n," all vertices of the graph have been processed and the program 700 ends. If "i" is not greater than "n," the vertex counter 206 supplies the value of "i" to the example vertex selector 208 (see FIG. 2) and the vertex selector 208 responds by accessing the graph storage 202 to identify the vertex corresponding to the value of "i" (e.g., the "ith" vertex, Vi) (block 710). In some examples, the vertex counter 206 also determines an order of the vertices (e.g., V1-V20) included in the graph 100 and supplies information identifying the vertices and identifying the order of the vertices to the vertex selector 208. In addition, the vertex selector 208 supplies the corresponding vertex identifier Vi (also referred to as the selected vertex identifier) to the neighboring vertex identifier 210 which proceeds to identify all of the vertices included in the graph 100 that are neighbors to the selected vertex identifier (e.g., Vi) (also at the block 710). The example neighboring vertex identifier 210, upon identifying a set of neighboring vertices that are adjacent to the selected vertex Vi, supplies a list of corresponding neighboring vertex identifiers to the example element populater 214 along with information identifying the selected vertex Vi (also at block 710).

The example element populater 214 uses the list of corresponding neighboring vertex identifiers to populate an element of the array corresponding to the "ith" vertex Vi (block 712). In this manner, the neighboring vertices of any of vertex of interest can be identified in the array using the number of the vertex of interest.

After, populating the "ith" element of the array with the list of neighboring vertex identifiers corresponding to the selected vertex Vi, the element populater 214 determines whether there are any overflow neighboring vertex identifiers that do not fit into the "ith" element (block 716). If not, the element populater 214 fills any remaining, empty vertex identifier storage positions of the ith element with zeros (block 718). In some examples, when the example list associated with ith vertex does not have any neighbors, all of the neighboring vertex identifiers storage positions are filled with zeros. In addition, the element populater 214 notifies the example pointer determiner 216 that there are no overflow of neighboring vertex identifiers (e.g., all of the neighboring vertex identifiers fit into a single element). In response, the pointer determiner 216 determines a "null" pointer indicating that there is no overflow and stores the null pointer in the pointer storage position of the first element (also at block 718). After populating the unfilled neighboring vertex identifier storage positions with zeros and storing the pointer, the program 700 returns to the block 708 at which the counter "i" is incremented and the program continues in the manner described above.

If (at the block 716) the element populater 214 determines that there are overflow neighboring vertex identifiers, the pointer determiner 216 determines a pointer corresponding to the n+m element and populates the pointer storage position of the ith element with pointer (block 722). In addition, the element creator 212 adds an n+m element to the array and the element populater 214 populates the neighboring vertex identifier storage positions of the n+m element with the overflow neighboring vertex identifiers (also at the block 722).

The element populater 214 then increments the counter "m" (block 724) and the element populater 214 determines if there are more overflow neighboring vertex identifiers associated with the "ith" vertex (block 726). If so, the element creator 212 adds another n+m element to the array, the element populater 214 populates the neighboring vertex identifier storage positions of the n+m element with the overflow neighboring vertex identifiers, and the pointer determiner 216 determines a pointer n+m and causes the pointer to be stored in the pointer storage of the n+m−1 element (block 728). The program then returns to the block 724 and the blocks subsequent thereto as described above. If, at the block 726, the element populater 214 determines there are no more overflow neighboring vertex identifiers associated with the "ith" vertex (block 726), the program returns to the block 708 at which the vertex counter variable "i" is again incremented so that a next vertex can be processed. As described above, when the number of vertices processed is equal to n, the program 700 ends.

The program 800 of FIG. 8 begins at a block 802 at which the example comparator 310 (see FIG. 3) determines whether the empty element counter 308 (see FIG. 3) has been incremented. In some examples, the empty element counter 308 is incremented by, for example, the element populater 214 (see FIG. 2) each time an element is left unpopulated for lack of neighboring vertices of the corresponding vertex. If the empty element counter has not been incremented, the program 800 returns to the block 802 and again determines whether the empty element counter 308 has been incremented. If so, the comparator 310 compares the value of the empty element counter to a threshold value stored in the example adjustable threshold holder 306. If the empty element counter does not satisfy the threshold, the program 800 returns to the block 802 and proceeds as described above. If the empty element counter satisfies the threshold value, the example neighborless vertex identifier 312 accesses the cache to identify all of the empty elements and also identifies all of the elements having a non-null pointer (block 806). The neighborless vertex identifier 312 notifies the example overflow element identifier 314 when all such empty elements have been identified and identifies a first such empty element to the overflow element identifier 314 (also at the block 806). The overflow element identifier 314 identifies an overflow element (e.g., element n+1) containing overflow neighboring vertex identifiers (block 808). The overflow element identifier 314 determines whether the number of neighboring vertex identifiers stored in the overflow element will fit into the empty element (e.g., whether n+1 is equal to or less than "k−1" (the variable representing the fixed number of neighboring vertex identifier positions in each element) (block 810). If not, the overflow data included in the element is not a candidate for movement to an empty element, and the overflow element identifier 314 identifies a next overflow element (e.g., element n+2) to evaluate against k−1 (block 808). When the number of neighboring vertex identifiers stored in the overflow element n+1 fit into the empty element (determined at the block 810), the overflow element identifier 314 notifies the example data/list mover 318 (see FIG. 3) which retains a zero in the first storage position of the empty element (block 812) and moves/copies the neighboring vertex identifiers currently stored in the overflow element n+1 to the neighboring vertex identifier storage positions of the first neighborless element beginning at the second storage position (block 814). The example pointer determiner/adjuster 316 also stores a "null" pointer in the formerly empty element (block 816).

When the data is moved, the data/list mover 318 notifies the example pointer determiner/adjuster 316 which responds by searching for an element containing a pointer that points to the n+1 element. This element containing the n+1 pointer contains a first portion of the list of neighboring vertex identifiers that also includes the overflow neighboring vertex identifiers stored in the element n+1. Upon identifying the element containing the n+1 pointer, the pointer determiner/adjuster 316 changes/revises/updates the pointer (n+1) to instead point to the second neighboring vertex identifier storage position of the formerly empty element (e.g., the element into which the neighboring vertex identifiers of the n+1 element have been copied/moved) (block 818). Thus, the new pointer points to the place in the array to which the overflow of the list of neighboring vertex identifiers has been moved.

Upon receiving instructions from the pointer determiner/adjuster 316 the example element creator 212 of FIG. 2 removes the n+1 element from the array (block 820) such that the element formerly numbered n+2 is renumbered n+1, the element formerly numbered n+3 is renumbered n+2, and so on. The element creator 212 notifies the pointer determiner/adjuster 316 when the n+1 element has been removed and the pointer determiner/adjuster 316 responds by adjusting all of the pointers as needed to account for the renumbered elements (e.g., a pointer that points to n+2 is revised to point to n+1 and a pointer that points to n+3 is revised to point to n+2) (block 822). When all of the changes are made to accommodate for the movement of the data to the formerly empty element and to accommodate for the deletion of the former n+1 element, the pointer determiner/adjuster 316 notifies the neighborless vertex identifier 312 which determines whether all empty elements have been processed and whether any overflow elements are still contained in the array (block 824). If all empty elements have been processed, the program 800 ends. If at least some of the empty elements have not been processed, the program 800 returns to the block 808 at which a next overflow element is located based on a non-null pointer and the program proceeds in the manner described above.

The program 900 of FIG. 9 begins at a block 902 at which the example vertex requester 404 (see FIG. 4) parses a request received from a data input and identifies a vertex of interest. In addition, the vertex requester 404 supplies a vertex identifier corresponding to the vertex of interest to the first element data fetcher 406 (also at the block 902). The first element data fetcher 406 fetches the neighboring vertex identifiers stored in the element corresponding to the vertex of interest (block 904) and supplies the fetched identifiers to the data analyzer 412 (block 906). When the first element data fetcher 406 is fetching the neighboring vertex identifiers stored in the element corresponding to the vertex of interest, the example first element data fetcher also extracts the pointer stored in the element and supplies the pointer to the pointer reader (also at block 904). The pointer reader reads the pointer and, and determines whether the pointer is a non-null value (block 908). If so, the pointer reader supplies the value of the non-null pointer to the second element data fetcher 410 (see FIG. 4) and the second element data fetcher 410 uses the non-null pointer to obtain the location of the element containing the overflow neighboring vertices of the vertex of interest (block 910). In addition, the second element data fetcher 410 pre-fetches the overflow neighboring vertices of the vertex of interest (block 910) and supplies the data to the data analyzer 412 (block 912). In some examples, the first and second element data fetchers 406, 410 are operating in parallel (or nearly in parallel) such that the overall time required to perform the memory access is greatly reduced. After the data is supplied to the data analyzer, the program 900 ends.

The program 1000 of FIG. 10 represents the operations represented by the block 702 of FIG. 7 and begins at a block 1002 at which the example vertex counter 206 of FIG. 2 identifies a graph to be accessed (e.g., a graph of interest). The vertex counter 206 then accesses the graph of interest (e.g., the graph 100) in the graph storage 202 (block 1004) and analyzes the graph to determine the number, "n," of vertices included in the graph 100 (block 1006). In some examples, the vertex counter 206 sets the value of "n" equal to the number of vertices. The example vertex counter 206 also identifies an ordering of the vertices based on the manner, for example, in which the vertices are connected by one or more edges (block 1008).

The number and order of vertices is supplied by the vertex counter 206 to the example vertex selector 208 and the number of vertices, n, is supplied to the neighboring vertex identifier 210 (block 1010). The vertex selector 208 selects a first vertex of the vertices included in the graph 100 based on the ordering of the vertices and supplies the selected vertex to the neighboring vertex identifier 210 (block 1012). The neighboring vertex identifier uses the selected vertex to identify all of the neighbors thereof (block 1014). In some examples, a "neighboring vertex" is a vertex that is connected by an edge that allows the neighboring vertex to be "reached" from the selected vertex. Thus, for example, referring again to FIG. 1, the vertex V4 is a neighbor of V2 (based on the arrow, V4 can be reached from V2) but V2 is not a neighbor of V4 because V2 cannot be reached from V4. If needed, the selected vertex and neighboring vertices are converted by the vertex selector 208 or the vertex identifier 210 to neighboring vertex identifiers (block 1016). Finally, a list of all neighboring vertex identifiers of the selected vertex along with the vertex identifier of the selected vertex are supplied to the element populater 214 and/or the element creator 212 (block 1018). After the block 1018, the program continues to the block 704 of FIG. 4. In addition, one or more of the blocks of FIG. 10 are repeated as needed at the block 710 of FIG. 7.

Figure 11:
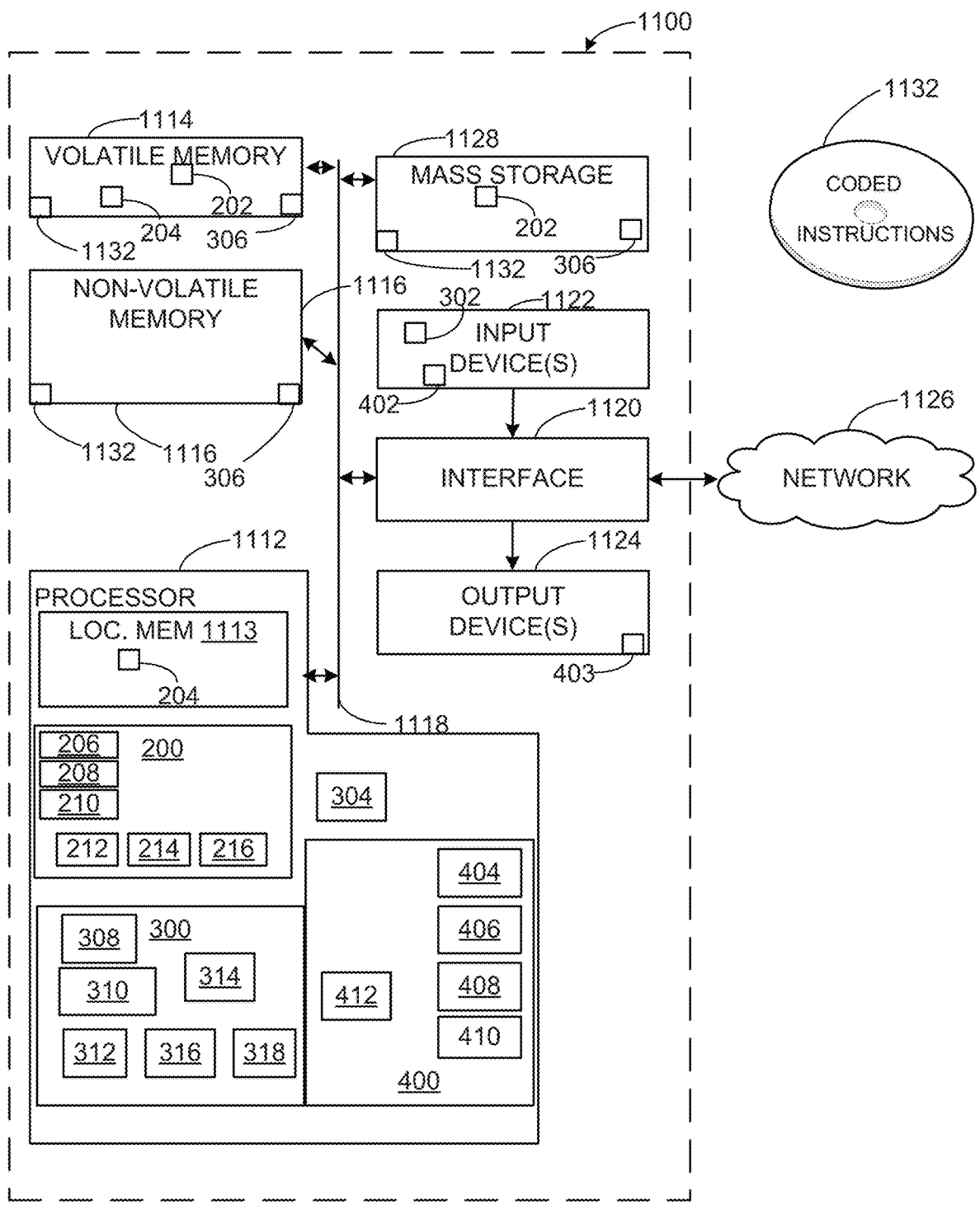
FIG. 11 is a block diagram of an example processing platform structured to execute the instructions of FIG. 7, FIG. 8, FIG. 9, and FIG. 10.

FIG. 11 is a block diagram of an example processor platform 1100 structured to execute the instructions of FIGS. 7, 8 and 9 to implement the adjacency array builder and populate 200 of FIG. 2, the compactor 300 of FIG. 3 and the adjacency array accessor 400 of FIG. 4. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example vertex counter 206, the example vertex selector 208, the example neighboring vertex identifier 210, the example element creator 212, the example element populater 214, the example pointer determiner 216, the example empty element counter 308, the example comparator 310, the example neighborless identifier 312, the example overflow element identifier 314, the example pointer determiner/adjuster 316, the example data/list mover 318, the example vertex requester 404, the example first element data fetcher 406, the example pointer reader 408, the example second element data fetcher 410, and/or the example data analyzer 412.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input device(s) 1122 is used to implement the example data input 302 and the example data input 304. In some examples, the data input 302 and the data input 304 are a same data input.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor. In some examples, the output device(s) are used to implement data output 403.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. Any of the local memory 1113 and/or the volatile memory 1114 can be used at to implement the cache memory 204 and the example graph storage 202. Any of the volatile memory 1114, the non-volatile memory 1116, and the mass storage 1128 can be used to implement the example adjustable threshold holder 306. The local memory 1113 can also be used to implement the cache memory 204 and/or the graph storage 202.

The machine executable instructions 1132 of FIGS. 7, 8 and 9 may be stored in the mass storage device 1128, in the volatile memory 1114, in the non-volatile memory 1116, and/or on a removable non-transitory computer readable storage medium such as a CD or DVD.

Example, apparatus, methods, and articles of manufacture to populate and build an adjacency array are disclosed herein. Example 1 is an apparatus to build a storage architecture for graph data that includes a neighbor identifier to identify respective sets of neighboring vertices of a graph. The neighboring vertices included in the respective sets are adjacent to respective ones of a plurality of vertices of the graph and respective sets of neighboring vertices are represented as respective lists of neighboring vertex identifiers. The apparatus also includes an element creator to create, in a cache memory, an array of elements that are unpopulated. The elements having lengths equal to a length of a cache line. In addition, the apparatus includes an element populater to populate the elements with neighboring vertex identifiers. Respective ones of the elements store neighboring vertex identifiers of respective ones of the lists of neighboring vertex identifiers.

Example 2 includes the apparatus of Example 1. In Example 2, the apparatus also includes a pointer determiner to determine pointers to store in the elements. The pointers include a first pointer stored in a first element to identify a second element when a number of the neighboring vertex identifiers included in a first list of neighboring vertices exceeds a storage capacity of the first element. The second element is added to an end of the array.

Example 3 includes the apparatus of Example 2. In Example 3, the pointers further include a second pointer stored in a third element. The second pointer indicates all of the neighboring vertices included in a second list are stored in the third element.

Example 4 includes the apparatus of Example 2. In Example 4, the pointer determiner is further to store the respective pointers in the respective elements in pointer positions located at the end of the respective elements.

Example 5 includes the apparatus of Example 2. In Example 5, the elements include a first element, a second element and a third element. The first element contains a first portion of a first list of neighboring vertex identifiers and a first pointer, the second element contains an overflow portion of the first list of neighboring vertex identifiers and a second pointer, and the third element contains zeros and a third pointer. The apparatus of the fifth example also includes a compactor to 1) replace the zeros of the third element, except for a first zero stored in a first vertex identifier storage position in the third element, with the overflow portion of the list of neighboring vertex identifiers contained in the second element, 2) adjust the first pointer to point to a second vertex identifier storage position in the third element instead of the second element, and 3) remove the second element from the array.

Example 6 includes the apparatus of Example 1. In Example 6, the array initially includes a number of original elements equal to a number of the plurality of vertices, and the element creator is to add respective additional elements to the array when at least one of the lists of neighboring vertex identifiers is too large to fit into a single element. The respective additional elements store a portion of the at least one of the lists of neighboring vertex identifiers that is too large to fit into a single element.

Example 7 includes the apparatus of Example 1. In example 7, one of the lists of neighboring vertex identifiers is a list of interest, the list of interest contains the neighboring vertex identifiers adjacent to a first vertex of the plurality of vertices, the plurality of vertices are ordered, and a first element populated with the list of interest in the array is based on a position in the order occupied by the first vertex.

Example 8 includes the apparatus of Example 1. In Example 8, the element populater is to populate the unfilled vertex identifier storage positions with zeros when a number of neighboring vertices included in a list used to populate any of the elements is less than a fixed number of vertex identifier storage positions included in the elements.

Example 9 includes the apparatus of Example 1. In Example 9, the apparatus also includes a vertex counter to count a number of the plurality of vertices included in the graph and the graph is stored in a graph storage. The apparatus further includes a vertex selector to: 1) access the graph storage to determine an order of the vertices in the graph, 2) select the vertices from among the vertices included in the graph based on the order of the vertices, and 3) supply respective ones of the selected vertices to the neighbor identifier for use in identifying the respective sets of neighboring vertices.

Example 10 includes one or more non-transitory machine-readable media including instructions that, when executed by one or more processors, cause the one or more processors to at least identify, for each vertex of a graph, a set of neighboring vertices. The set of neighboring vertices are represented as a list of neighboring vertex identifiers, the instructions also cause the one or more processors to create, in a cache memory, an array of elements, each of the elements having storage capacity for a fixed number of vertex identifiers, and a length of the elements equal to a length of a cache line. The instructions further cause the one or more processors to populate respective elements of the array with respective ones of the lists of neighboring vertex identifiers. The elements are populated with neighboring vertices of a single one of the respective lists.

Example 11 includes the instructions of Example 10. In Example 11, the instructions further cause the one or more processors to determine respective pointers for respective elements. And the respective pointers are to identify respective added elements at the end of the array when respective lists contain a number of neighboring vertex identifiers greater than a number of vertex identifier storage positions included in the elements.

Example 12 includes the instructions of Example 11. In Example 12, the elements include a first element, a second element and a third element and the first element contains a first portion of a first list of neighboring vertex identifiers and a first pointer. The second element contains an overflow portion of the first list of neighboring vertex identifiers and a second pointer, and the third element contains zeros and a third pointer. In Example 12, the instructions, when executed, further cause the one or more processors to replace the zeros of the third element, except for a first zero stored in a first vertex identifier storage position in the third element, with the overflow portion of the list of neighboring vertex identifiers contained in the second element. The instructions further cause the one or more processors to adjust the first pointer to point to a second vertex identifier storage position in the third element instead of the second element, and remove the second element from the array.

Example 13 includes the instructions of Example 11. In Example 13 the instructions further cause the one or more processors to determine a null pointer to indicate all of the neighboring vertex identifiers of the first list are represented in the first element when a number of the neighboring vertex identifiers of a first list used to populate a first element of the array is equal to or less than a fixed number of vertex identifier storage positions in the elements.

Example 14 includes the instructions of the Example 11. In Example 14, the instructions, when executed, further cause the one or more processors to store the respective pointers in the respective elements in a pointer storage position located at the end of the respective elements.

Example 15 includes the instructions of Example 11. In example 15, the instructions further cause the one or more processors to populate the empty vertex identifier storage positions of the one of the elements being populated with zeros when a number of neighboring vertex identifiers included in a list being used to populated one of the elements is less than a fixed number of vertex identifier storage positions in the element.

Example 16 includes the instructions of Example 10. In Example 16, the number of elements initially created for the array is equal to a number of the plurality of vertices.

Example 17 includes the instructions of Example 10. In Example 17, the vertices for which corresponding sets of neighboring vertices have been identified are associated with a same identifier as the array element populated with the corresponding sets of neighboring vertices.

Example 18 includes the instructions of Example 10. In Example 18, the instructions further cause the one or more processors count a number of the plurality of vertices included in the graph, the graph stored in a graph storage, access the graph storage to determine an order of the plurality of vertices in the graph, select the vertices from among the plurality of vertices included in the graph based on the order of the vertices, and supply respective ones of the selected vertices to a neighbor identifier for use in identifying the respective sets of neighboring vertices.

Example 19 includes an array builder to store graph data. In Example 19, the array builder includes means for identifying respective sets of neighboring vertices of a graph. The neighboring vertices included in the respective sets are adjacent to respective ones of a plurality of vertices of the graph and respective sets of neighboring vertices are represented as respective lists of neighboring vertex identifiers. The array builder also includes means for creating, in a cache memory, an array of elements that are unpopulated. The elements have lengths equal to a length of a cache line, and the array builder includes means for populating the elements with neighboring vertex identifiers. Respective ones of the elements store neighboring vertex identifiers of respective ones of the lists of neighboring vertex identifiers.

Example 20 includes the array builder of Example 19. In Example 20, the array builder further includes means for determining pointers to store in the elements. The pointers include a first pointer stored in a first element to identify a second element when a number of the neighboring vertex identifiers included in a first list of neighboring vertices exceeds a storage capacity of the first element, the second element added to an end of the array.

Example 21 includes the array builder of Example 20. In Example 21, the pointers further include a second pointer stored in a third element. The second pointer indicates all the neighboring vertices included in a second list are stored in the third element.

Example 22 includes the array builder of Example 19. In Example 22, array initially includes a number of original elements equal to a number of the plurality of vertices, and the means for creating the array is to add respective additional elements to the array when at least one of the respective lists of neighboring vertex identifiers exceeds a storage capacity of a single element, the respective additional elements to store a portion of the at least one of the respective lists of neighboring vertex identifiers.

Example 23 includes the array builder of Example 19. In Example 23, the means for populating populates the unfilled vertex identifier storage positions with zeros when a number of neighboring vertices included in a list used to populate any of the elements is less than a fixed number of vertex identifier storage positions included in the elements.

Example 24 includes the array builder of Example 19. In Example 24, the elements include a first element, a second element and a third element. The first element contains a first portion of a first list of neighboring vertex identifiers and a first pointer, the second element contains an overflow portion of the first list of neighboring vertex identifiers and a second pointer, and the third element contains zeros and a third pointer. In example 24, the array builder also includes means for replacing the zeros of the third element, except for a first zero stored in a first vertex identifier storage position in the third element, with the overflow portion of the list of neighboring vertex identifiers contained in the second element, and includes means for adjusting the first pointer to point to a second vertex identifier storage position in the third element instead of the second element. The array builder of example 24 further includes means for causing the element creator to remove the second element from the array.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to build a storage architecture for graph data, the apparatus comprising
   instructions in the apparatus; and
   at least one processor to execute the instructions to at least:
      identify sets of neighboring vertices of a graph, the neighboring vertices included in each set to be adjacent to a different one of a plurality of vertices of the graph, each set of neighboring vertices represented as one of a plurality of lists of neighboring vertices;
      create, in a cache memory, an array of elements that are unpopulated, the elements having lengths equal to a length of a cache line;
      populate the elements with identifiers of neighboring vertices, respective ones of the elements storing identifiers of neighboring vertices of respective ones of the lists of neighboring vertices;
      determine pointers to store in the elements, the pointers including a first pointer stored in a first element to identify a second element when a number of the identifiers of neighboring vertices included in a first list exceeds a storage capacity of the first element, the second element added to an end of the array, the second element including a second pointer and a third element, the third element containing zeros and including a third pointer;
      except for a first zero in a first vertex identifier storage position in the third element, replace the zeros of the third element with the identifiers of the neighboring vertices of the first list that are stored in the second element;
      adjust the first pointer to point to a second vertex identifier storage position in the third element instead of the second element; and
      remove the second element from the array.

2. The apparatus of claim 1, wherein the at least one processor is to cause storage of respective ones of the pointers in respective ones of the elements in pointer positions located at the end of the respective ones of the elements.

3. The apparatus of claim 1, wherein the array initially includes a number of original elements equal to a number of the plurality of vertices, and the at least one processor is to add respective additional elements to the array when at least one of the lists of neighboring vertices is too large to fit into a single element, the respective additional elements to store a portion of the at least one of the lists of neighboring vertices that is too large to fit into a single element.

4. The apparatus of claim 1, wherein at least one of the lists of neighboring vertices is a list of interest, the list of interest contains the identifiers of the neighboring vertices adjacent to a first vertex of the plurality of vertices of the graph, the plurality of vertices are ordered, and a first element to be populated with the list of interest is based on a position in the order occupied by the first vertex.

5. The apparatus of claim 1, wherein the at least one processor is to populate unfilled vertex identifier storage positions with zeros when a number of neighboring vertices included in one of the lists of neighboring vertices is less than a fixed number of vertex identifier storage positions.

6. The apparatus of claim 1, wherein the at least one processor is to:
- count a number of the plurality of vertices included in the graph, the graph stored in a graph storage;
- access the graph storage to determine an order of the vertices in the graph;
- select the vertices from among the vertices included in the graph based on the order of the vertices; and
- supply respective ones of the selected vertices for use in identifying the respective sets of neighboring vertices.

7. One or more non-transitory computer readable media including instructions that, when executed, cause one or more processors to at least:
- identify, for each vertex of a graph, a set of neighboring vertices, the set of neighboring vertices represented as a list of neighboring vertex identifiers;
- create, in a cache memory, an array of elements, the elements having storage capacity for a fixed number of vertex identifiers, and ones of the elements of the array having a same length as a cache line;
- populate respective elements of the array with respective ones of the lists of neighboring vertex identifiers, the elements populated with neighboring vertices of a single one of the respective lists, the elements to include a first element, a second element and a third element, the first element containing a first portion of a first list of neighboring vertex identifiers and a first pointer, the second element containing an overflow portion of the first list of neighboring vertex identifiers and a second pointer, the third element containing zeros and a third pointer;
- replace the zeros of the third element, except for a first zero stored in a first vertex identifier storage position in the third element, with the overflow portion of the list of neighboring vertex identifiers contained in the second element;
- adjust the first pointer to point to a second vertex identifier storage position in the third element instead of the second element; and
- remove the second element from the array.

8. The one or more non-transitory computer readable media of claim 7, wherein the instructions, when executed, cause the one or more processors to determine respective pointers for respective elements, respective pointers to identify respective added elements at the end of the array when respective lists contain a number of identifiers of neighboring vertices greater than a number of vertex identifier storage positions included in the elements.

9. The one or more non-transitory computer readable media of claim 7 wherein the instructions, when executed, cause the one or more processors to determine a null pointer to indicate all the identifiers of the neighboring vertices of a first list of the respective lists of neighboring vertex identifiers are represented in a first element.

10. The one or more non-transitory computer readable media of claim 8, wherein the instructions, when executed, cause the one or more processors to cause storage of the respective pointers in the respective elements in a pointer storage position located at the end of the respective elements.

11. The one or more non-transitory computer readable media of claim 7, wherein the instructions, when executed, cause the one or more processors to populate empty vertex identifier storage positions with zeros.

12. The one or more non-transitory computer readable media of claim 7, wherein a number of elements initially created for the array is equal to a number of vertices.

13. The one or more non-transitory computer readable media of claim 7, wherein the vertices for which corresponding sets of neighboring vertices have been identified are associated with a same identifier as the array element populated with the corresponding sets of neighboring vertices.

14. The one or more non-transitory computer readable media of claim 7, wherein the instructions, when executed, cause the one or more processors to:
- count a number of vertices included in the graph, the graph stored in a graph storage;
- access the graph storage to determine an order of the plurality of vertices in the graph;
- select the vertices from among the vertices included in the graph based on the order of the vertices; and
- supply respective ones of the selected vertices to a neighbor identifier for use in identifying the respective sets of neighboring vertices.

* * * * *

UNITED STATES PATENT AND TRADEMARK OFFICE
CERTIFICATE OF CORRECTION

| | | |
|---|---|---|
| PATENT NO. | : 11,526,483 B2 | Page 1 of 1 |
| APPLICATION NO. | : 15/941262 | |
| DATED | : December 13, 2022 | |
| INVENTOR(S) | : Eyerman et al. | |

It is certified that error appears in the above-identified patent and that said Letters Patent is hereby corrected as shown below:

In the Specification

Column 1 Line 9 insert:
--STATEMENT REGARDING FEDERALLY SPONSORED RESEARCH OR DEVELOPMENT
This invention was made with Government support under Agreement No. HR0011-17-3-0004, awarded by DARPA. The Government has certain rights in the invention.--

Signed and Sealed this
Thirty-first Day of January, 2023

*Katherine Kelly Vidal*

Katherine Kelly Vidal
*Director of the United States Patent and Trademark Office*